(12) United States Patent
Parrotto et al.

(10) Patent No.: US 8,490,494 B2
(45) Date of Patent: Jul. 23, 2013

(54) RELATIVE PRESSURE SENSOR

(75) Inventors: Davide Parrotto, Weil am Rhein (DE); Anh Tuan Tham, Berlin (DE); Frank Passler, Berlin (DE); Olaf Krusemark, Kassel (DE); Ulrich Buder, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 164 days.

(21) Appl. No.: 13/125,413

(22) PCT Filed: Aug. 12, 2009

(86) PCT No.: PCT/EP2009/060410
§ 371 (c)(1),
(2), (4) Date: Apr. 21, 2011

(87) PCT Pub. No.: WO2010/046148
PCT Pub. Date: Apr. 29, 2010

(65) Prior Publication Data
US 2011/0209552 A1    Sep. 1, 2011

(30) Foreign Application Priority Data

Oct. 24, 2008  (DE) .......................... 10 2008 043 175

(51) Int. Cl.
*G01L 7/00*  (2006.01)
(52) U.S. Cl.
USPC ......................................................... 73/706
(58) Field of Classification Search
USPC ................................. 73/700–756
See application file for complete search history.

(56) References Cited

U.S. PATENT DOCUMENTS

| | | | |
|---|---|---|---|
| 2001/0013254 A1* | 8/2001 | Werner et al. | 73/700 |
| 2001/0015105 A1* | 8/2001 | Gerst et al. | 73/715 |
| 2004/0149042 A1* | 8/2004 | Gerst et al. | 73/723 |
| 2006/0254363 A1* | 11/2006 | Hegner et al. | 73/724 |

FOREIGN PATENT DOCUMENTS

| | | |
|---|---|---|
| CN | 1695049 A | 11/2005 |
| DE | G 93 15 086.5 | 1/1994 |
| DE | 102 27 479 A1 | 1/2004 |
| DE | 103 16 033 A1 | 10/2004 |

(Continued)

OTHER PUBLICATIONS

English translation of the International Search Report.
International Search Report.
German Search Report.

*Primary Examiner* — Andre Allen
(74) *Attorney, Agent, or Firm* — Bacon & Thomas, PLLC

(57) ABSTRACT

A relative pressure sensor for registering pressure of a medium relative to surrounding atmospheric pressure includes: a pressure measuring cell having a measuring membrane and a platform, wherein pressure of the medium can act on a first side of the measuring membrane facing away from the platform, and wherein the platform has a reference air opening, through which surrounding atmospheric pressure can act on a second side of the measuring membrane facing the platform. A support body, through which a reference air duct extends between a first surface section and a second surface section of the support body is provided, wherein the pressure measuring cell is affixed to the support body with a pressure resistant, bonded adhesive. The reference air opening communicates with the reference air duct, in order to form a reference air path to the measuring membrane, wherein the bonded adhesive surrounds the reference air path, and the relative pressure sensor further includes a shield element, which protects the bonded adhesive from direct contact with reference air.

13 Claims, 3 Drawing Sheets

FOREIGN PATENT DOCUMENTS

| | | |
|---|---|---|
| DE | 10 2004 048 367 A1 | 4/2006 |
| DE | 10 2006 013 414 A1 | 9/2006 |
| DE | 10 2007 015 397 A1 | 10/2008 |
| EP | 0 658 754 B1 | 6/1995 |
| EP | 1 061 351 A1 | 12/2000 |
| EP | 1 070 948 A1 | 1/2001 |
| WO | WO 03/058186 A2 | 7/2003 |

* cited by examiner

RELATIVE PRESSURE SENSOR

TECHNICAL FIELD

The present invention relates to a relative pressure sensor, especially a relative pressure sensor with improved moisture resistance.

BACKGROUND DISCUSSION

A pressure sensor of such generic type for registering pressure of a medium relative to the surrounding atmospheric pressure includes: a pressure measuring cell having a measuring membrane and a platform, wherein pressure of the medium can act on a side of the measuring membrane facing away from the platform, and wherein the platform has a reference air opening, through which surrounding atmospheric pressure can act on a side of the measuring membrane facing the platform; and a support body, through which a reference air duct extends between a first surface section and a second surface section of the support body; wherein the pressure measuring cell is affixed to the support body with a pressure resistant, bonded adhesive; the reference air opening communicates with the reference air duct, in order to form a reference air path to the measuring membrane; and the bonded adhesive surrounds the reference air path.

The bonded adhesive is pressure bearing, i.e. it must essentially absorb without plastic deformation the force due to the difference between the pressure of the medium and the atmospheric pressure acting on the pressure measuring cell.

For pressure bearing connections in the field of construction and joining technology of pressure sensors, adhesives are required, which are distinguished by freedom from creep and high final strength. Suitable adhesives include, for example, epoxide adhesives.

A change of mechanical properties of the bonded adhesive can lead to changed mechanical stresses on the platform, and these stresses can then be transmitted through the platform to the measuring membrane.

Insofar as the reference air naturally has variable water content, it proves to be a problem that the named adhesives and their interfaces to other materials have high moisture sensitivity. A moisture loading of the bonded adhesive with the associated changes of the adhesive properties can, thus, result in a corruption of measured pressure values.

Hydrophobic, moisture impermeable adhesives or caulks, such as e.g. silicone rubber are, however, due to their low strength or due to their plasticity, not suitable, in the case of high pressure loadings, for obtaining dimensionally stable, pressure-bearing, sealed adhesion of a pressure measuring cell to a support body.

SUMMARY OF THE INVENTION

It is, consequently, an object of the present invention to provide a relative pressure sensor overcoming the described disadvantages.

The object is solved according to the invention by a relative pressure sensor which includes a pressure measuring cell having a measuring membrane and a platform, wherein pressure of the medium can act on a first side of the measuring membrane facing away from the platform, and wherein the platform has a reference air opening, through which surrounding atmospheric pressure can act on a second side of the measuring membrane facing the platform; and a support body, through which a reference air duct extends between a first surface section and a second surface section of said support body; and a shield element, which protects a bonded adhesive from direct contact with reference air, wherein: said pressure measuring cell is affixed to said support body with said pressure resistant, bonded adhesive; said reference air opening communicates with said reference air duct, in order to form a reference air path to the measuring membrane; and said bonded adhesive surrounds said reference air path.

The relative pressure sensor of the invention is characterized by a shield element protecting the bonded adhesive from direct contact with reference air.

According to a first embodiment of the invention, the shield element can comprise a tube extending through the bonded adhesive.

According to a further development of the invention, the tube can especially be a projection of the platform, wherein the reference air opening of the platform extends through the tube.

Furthermore, the pressure measuring cell can have an axial abutment surface, which extends essentially perpendicularly to the axis of the tube or the reference air opening, and which, with the possibility of interposed bonded adhesive, defines the position of the pressure measuring cell relative to the platform.

In a further development of the invention, the tube can extend through the support body.

According to a further development of the invention, the tube can be connected at its end section facing away from the measuring cell with a hose, for example, a silicone hose, through which the reference air is fed.

According to a further development of the invention the support body can comprise a metal material.

According to a second embodiment of the invention, the shield element can comprise a sleeve-shaped projection, which surrounds the reference air path and which extends from the support body into the reference air opening.

The support body can have, furthermore, an axial abutment surface which extends essentially perpendicularly to the axis of the sleeve-shaped projection or the reference air opening, and which, with the possibility of interposed bonded adhesive, defines the position of the pressure measuring cell relative to the support body. Additionally, the platform in the case of this embodiment can have a second axial, annular abutment surface, which forms an axial reference position for the end face of the sleeve-shaped projection. This can be achieved when the platform, up to the abutment surface, has a bore with a diameter larger than the outer diameter of the sleeve-shaped projection and that, from the abutment surface, a bore with a smaller diameter than the outer diameter of the sleeve-shaped projection extends through the platform.

According to a further development of the invention, the bonded adhesive can be an epoxide resin. According to an embodiment of the invention, the shield element can comprise for example, a hydrophobic polymer, especially a silicone polymer, with which, for example, direct contact between the reference air path and the bonded adhesive is avoided.

Especially in the case of the second embodiment of the invention, an annular shield element of silicone rubber can be arranged between the end face of the sleeve-shaped projection and the second axial abutment surface, in order to protect the annular bonded adhesive extending outside the shield element from the reference air path.

The pressure measuring cell can comprise especially a semiconductor sensor with a piezoresistive transducer, a capacitive transducer or a transducer having an optical or mechanical resonator.

In a further development of the invention, the platform can be glass or a semiconductor.

According to the invention, the pressure sensor can further comprise a hydraulic pressure transmitter having a pressure transmitter body and a flexible isolating diaphragm, secured to a surface of the pressure transmitter body to form a pressure chamber between the pressure transmitter body and the isolating diaphragm, wherein the pressure transmitter body additionally has a measuring cell chamber, in which the pressure measuring cell is arranged, wherein a hydraulic path extends between the pressure chamber and the measuring cell chamber, by means of which pressure of medium acting on the isolating diaphragm can be applied to the first side of the measuring membrane.

BRIEF DESCRIPTION OF THE DRAWINGS

The invention will now be explained based on examples of embodiments shown in the drawing, the figures of which show as follows.

DETAILED DISCUSSION IN CONJUNCTION WITH THE DRAWINGS

Figure 1:
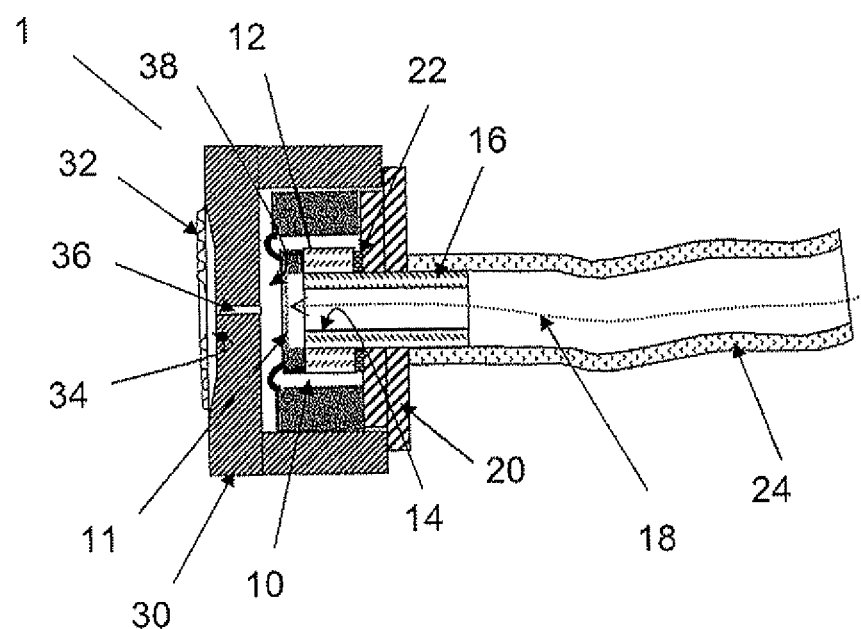
FIG. 1 is a longitudinal section through a first example of an embodiment of a pressure sensor according to the invention.

FIG. 1 shows a relative pressure sensor 1 of the invention. Pressure sensor 1 includes a pressure measuring cell 10, which includes a piezoresistive semiconductor transducer core with a measuring membrane 11, wherein the semiconductor sensor is connected to a platform 12 by means of anodic bonding in its edge region. Platform 12 is made of glass and includes a traversing, reference air opening 14, in which an end section of a glass tube 16 is inserted. The outside of the glass tube 16 in the reference air opening is melt bonded to the platform 12, so that the reference air acts on the measuring membrane 11 exclusively via a reference air path 18 extending through the glass tube.

Platform 12, on its side facing away from the semiconductor transducer core, is adhered to a metal support body 20 with an epoxide resin bonded adhesive 22. Glass tube 16 extends through an opening in the support body 20. Applied to an end section of the glass tube 16 protruding from the support body 20 is a hose 24, especially a silicone rubber hose, through which the reference air path 18 extends. In this way, the bonded adhesive 22 is reliably prevented from being exposed to the reference air.

The relative pressure sensor further includes a hydraulic pressure transmitter having a pressure transmitter body 30 and a flexible isolating diaphragm 32 secured to a surface of the pressure transmitter body 30 to form a pressure chamber 34 between the pressure transmitter body 30 and the isolating diaphragm 32. The pressure transmitter body 30 additionally has a measuring cell chamber 38, in which the pressure measuring cell 10 is arranged. Extending between pressure chamber 34 and the measuring cell chamber 38 is a bore 36, by means of which pressure of medium acting on the isolating diaphragm can be applied to the first side of the measuring membrane 11 facing away from the platform 12. For pressure transfer, pressure chamber 34, bore 36 and the free volume of the measuring cell chamber 38 are filled with a pressure transfer liquid. For affixing the pressure measuring cell relative to the pressure transmitter and for sealing the measuring cell chamber 38, support body 20 is welded to the pressure transmitting body 30.

Figure 2:
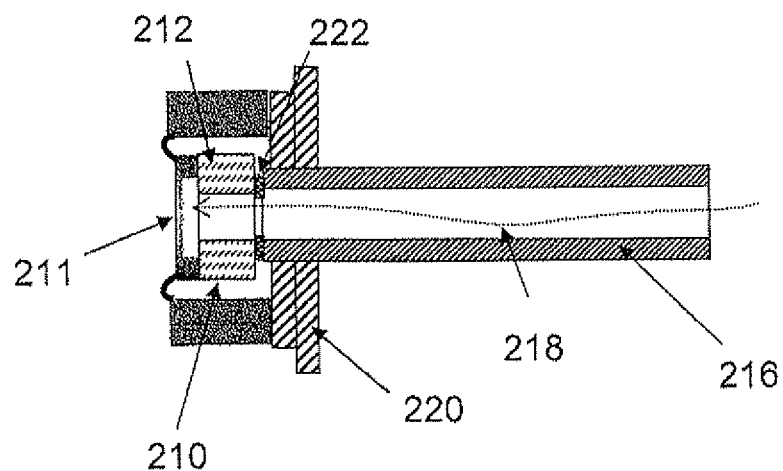
FIG. 2 is a longitudinal section through a relative pressure sensor according to the state of the art.

FIG. 2 sketches a relative pressure sensor of the state of the art. In this case, the pressure transmitter is omitted to simplify the presentation. Here, a pressure measuring cell 210 having a transducer core 211 and glass platform 212 is secured with the glass platform by means of an epoxide resin, bonded adhesive 222 to a support body 220, which includes a reference air tube 216. Glass platform 212 is adhered to the end face of the tube 216. This has the result that the bonded adhesive 222 is not protected from the reference air. Rather, the bonded adhesive 222 is a component of the wall of the reference air path 218. Therewith, the mechanical properties of the bonded adhesive change as a function of moisture and temperature.

Figure 3:
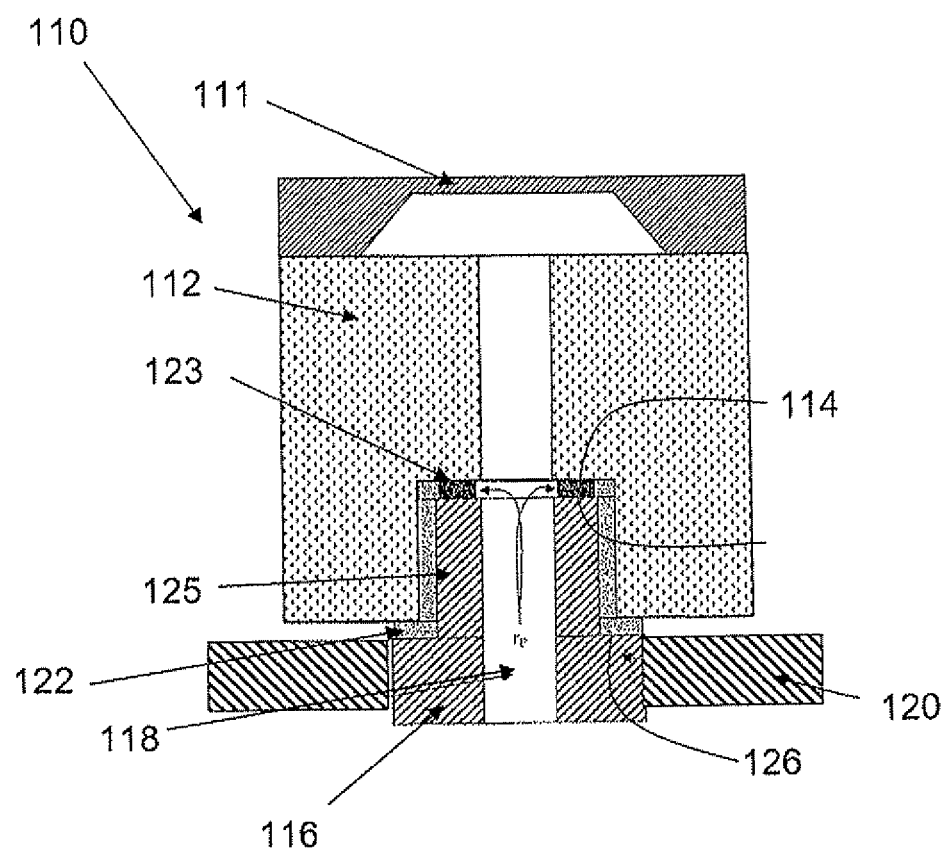
FIG. 3 is a longitudinal section through a second example of an embodiment of a pressure sensor according to the invention.

FIG. 3 shows a second example of an embodiment of a relative pressure sensor modifying the concept of the bonded adhesive on the end face of a reference air tube. The relative pressure sensor includes a pressure measuring cell 110, which has a piezoresistive transducer core with measuring membrane 111 and a silicon platform 112. The transducer core is connected around its edge region to the silicon platform. The silicon platform 112 includes a traversing bore, through which reference air can act on the measuring membrane 111. The bore has a first diameter in a section facing the measuring membrane. This is followed by a second section, which has a second diameter larger than the first diameter. The second section extends to a surface of the silicon platform 112 facing away from the measuring membrane. Between the first section and the second section a radial shoulder is formed, which serves as a first axial abutment surface 114 for positioning the pressure measuring cell 110 relative to the support body 120. The support body includes a reference air tube 116, a portion of which is a sleeve shaped projection from a surface of the support body. The reference air tube has, in an end section 125 after a radial shoulder, a lessened outer diameter, wherein the outer diameter of the end section is smaller than the second diameter of the bore in the silicon platform 112. The radial shoulder serves as a second axial abutment surface 126, by which the position of the pressure measuring cell 110 is fixed relative to the support body 120. The axial separation of the second axial abutment surface 126 from the end surface of the reference air tube 116 is about equal to the length of the second section of the bore through the silicon platform 112.

A silicone rubber, annular moisture barrier 123 is provided between the first abutment surface 114 and the end surface of the reference air tube 116. Therewith, a pressure bearing bonded adhesive 122, which extends first between the lateral surface of the end section 125 of the reference air tube 116 and the wall of the second section of the bore and secondly between the second abutment surface 126 and a base surface of the silicon platform 112, is protected from moist reference air.

The pressure bearing bonded adhesive comprises an epoxide resin. Since this is protected by means of the silicone rubber barrier 123 from the reference air path 118 extending through the bore and through the reference air tube 116, a moisture dependent degrading of the pressure-bearing adhesion can be avoided.

The invention claimed is:

1. A relative pressure sensor for registering the pressure of a medium relative to surrounding atmospheric pressure, comprising:

a pressure measuring cell having a measuring membrane and a platform, wherein pressure of the medium can act on a first side of the measuring membrane facing away from the platform, and wherein the platform has a reference air opening, through which surrounding atmospheric pressure can act on a second side of the measuring membrane facing the platform; and a support body, through which a reference air duct extends between a first surface section and a second surface section of said support body; and a shield element, which protects a bonded adhesive from direct contact with reference air, wherein:

said pressure measuring cell is affixed to said support body with said pressure resistant, bonded adhesive;

said reference air opening communicates with said reference air duct, in order to form a reference air path to the measuring membrane; and said bonded adhesive surrounds said reference air path.

2. The relative pressure sensor as claimed in claim 1, wherein:
said shield element comprises a tube, which extends through said bonded adhesive.

3. The relative pressure sensor as claimed in claim 2, wherein:
said tube is a projection of the platform; and
said reference air opening runs through said tube.

4. The relative pressure sensor as claimed in claim 2, wherein:
said pressure measuring cell has, furthermore, an axial abutment surface, which extends essentially perpendicularly to the axis of said tube or the reference air opening, and which, with the possibility of interposed bonded adhesive, defines a position of said pressure measuring cell relative to the support body.

5. The relative pressure sensor as claimed in claim 2, wherein:
said tube extends through said support body.

6. The relative pressure sensor as claimed in claim 2, wherein:
said tube is connected on its end section facing away from said measuring cell to a hose, through which reference air is fed.

7. The relative pressure sensor as claimed in claim 1, wherein:
said shield element has a sleeve-shaped projection, which surrounds the reference air path, and which extends from said support body into said reference air opening.

8. The relative pressure sensor as claimed in claim 7, wherein the support body furthermore has an axial abutment surface, which extends essentially perpendicularly to the axis of the sleeve-shaped projection or the reference air opening, and which, with the possibility of interposed bonded adhesive, defines a position of the pressure measuring cell relative to the support body.

9. The relative pressure sensor as claimed in claim 1, wherein the bonded adhesive comprises an epoxide resin.

10. The relative pressure sensor as claimed in claim 1, wherein the shield element comprises a hydrophobic polymer, especially a silicone polymer.

11. The relative pressure sensor as claimed in claim 1, wherein the support body comprises a metal material.

12. The relative pressure sensor as claimed in claim 1, wherein the pressure measuring cell comprises a semiconductor sensor with a piezoresistive transducer, a capacitive transducer or a transducer having an optical or mechanical resonator.

13. The relative pressure sensor as claimed in claim 1, further comprising:
a hydraulic pressure transmitter having a pressure transmitter body and a flexible isolating diaphragm secured to a surface of said pressure transmitter body to form a pressure chamber between said pressure transmitter body and said isolating diaphragm, wherein:

said pressure transmitter body additionally has a measuring cell chamber, in which said pressure measuring cell is arranged; and a hydraulic path extends between said pressure chamber and said measuring cell chamber, by means of which pressure of medium acting on said isolating diaphragm can be applied to the first side of said measuring membrane.

* * * * *